(12) United States Patent
Tanabe et al.

(10) Patent No.: US 9,079,556 B2
(45) Date of Patent: Jul. 14, 2015

(54) AIRBAG MODULE EQUIPPED SEAT

(71) Applicant: TS TECH CO., LTD., Asaka-shi, Saitama (JP)

(72) Inventors: Jinichi Tanabe, Tochigi (JP); Masaya Furuta, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/389,427

(22) PCT Filed: Mar. 28, 2013

(86) PCT No.: PCT/JP2013/059305
§ 371 (c)(1),
(2) Date: Sep. 30, 2014

(87) PCT Pub. No.: WO2013/147042
PCT Pub. Date: Oct. 3, 2013

(65) Prior Publication Data
US 2015/0054261 A1 Feb. 26, 2015

(30) Foreign Application Priority Data
Mar. 30, 2012 (JP) ................................. 2012-081256

(51) Int. Cl.
| | |
|---|---|
| *B60R 21/207* | (2006.01) |
| *B60N 2/44* | (2006.01) |
| *B60R 21/26* | (2011.01) |
| *B60R 21/16* | (2006.01) |
| *B60N 2/58* | (2006.01) |

(52) U.S. Cl.
CPC .............. *B60R 21/207* (2013.01); *B60N 2/449* (2013.01); *B60R 21/26* (2013.01); *B60N 2002/5808* (2013.01); *B60R 21/16* (2013.01)

(58) Field of Classification Search
CPC ...... B60R 21/16; B60R 21/26; B60R 21/207; B60N 2/449; B60N 2002/5808
See application file for complete search history.

(56) References Cited

U.S. PATENT DOCUMENTS

| | | | |
|---|---|---|---|
| 6,439,597 B1* | 8/2002 | Harada et al. .............. | 280/728.2 |
| 8,079,640 B2* | 12/2011 | Kim et al. ...................... | 297/224 |
| 2007/0085308 A1* | 4/2007 | Tracht et al. ................ | 280/730.2 |
| 2010/0295282 A1* | 11/2010 | Kim et al. ................... | 280/730.2 |
| 2012/0248748 A1* | 10/2012 | Ciszek ......................... | 280/730.2 |
| 2014/0312664 A1* | 10/2014 | Tanabe et al. ............. | 297/216.13 |

FOREIGN PATENT DOCUMENTS

| | | | |
|---|---|---|---|
| JP | 08-258660 A | | 10/1996 |
| JP | 11-078758 A | | 3/1999 |
| JP | 2010-095020 A | | 4/2010 |
| JP | 4560659 B2 | | 10/2010 |
| JP | 2013199152 A | * | 10/2013 |

* cited by examiner

*Primary Examiner* — Faye M Fleming
(74) *Attorney, Agent, or Firm* — Drinker Biddle & Reath LLP

(57) ABSTRACT

Provided is an airbag module equipped seat that has high attachment rigidity when a guide member for guiding the deployment direction of an airbag module is attached to the airbag module by using an attachment member. An airbag module equipped seat includes a side frame that extends along a side portion of the seat, an airbag module that is attached to the side frame, and a guide member that is attached to a trim cover of the seat to guide the deployment direction of the airbag module. The side frame includes a plurality of side frame elements that extend along the side portion of the seat and are connected to each other in at least one position while facing each other, and the guide member is attached to the side frame.

11 Claims, 10 Drawing Sheets

AIRBAG MODULE EQUIPPED SEAT

CROSS REFERENCE TO RELATED APPLICATIONS

This application is the U.S. national phase of the International Patent Application No. PCT/JP2013/059305, filed Mar. 28, 2013, which claims the benefit of the Japanese Patent Application No. 2012-081256, filed Mar. 30, 2012, the entire content being incorporated herein by reference.

BACKGROUND

Disclosed herein is an airbag module equipped seat, and particularly, an airbag module equipped seat in which an end of a guide member for guiding the deployment direction of an airbag is attached to a side frame.

Hitherto, as an airbag module equipped seat, there has been proposed a seat in which an airbag module is attached to a side frame of a seat back frame, ends of a trim cover and one-side ends of two stay cloths are sewn together to form a fracture portion of the trim cover, the airbag module is enclosed by two stay cloths drawn into the trim cover from the fracture portion, and the entire seat back including the airbag module is covered by the trim cover (see, for example, Japanese Patent No. 4560659 ("the '659 Patent")).

In the '659 Patent, a module cover that stores the airbag module therein is provided with a bar-shaped locking pin extending in the up and down direction, and a suspension hook is connected to an end opposite to the fracture portion of the stay cloth extending from the fracture portion of the trim cover. The end opposite to the fracture portion of the stay cloth is connected and fixed to the module cover in a manner such that the suspension hook is locked to the locking pin of the module cover.

According to the invention of the '659 Patent, the stay cloth may be pulled into a hollow portion from an opening edge of a back pad, and a suspension hook of a trim code may be locked to the locking pin of the module cover at the inside of the hollow portion. Thus, the stay cloth may be simply assembled in a compact size.

However, in the invention of the '659 Patent, the suspension hook is locked to the locking pin provided in the module cover. Since the module cover is formed by resin molding or the like in many cases as in the '659 Patent, there has been a desire to improve the rigidity of a member to which the suspension hook is attached.

Further, since the stay cloth is attached to the airbag module by using an attachment member like the suspension hook, the attachment workability is good, the separation of the attachment member hardly occurs, the periphery of an attachment mechanism is compactly housed in the cushion pad, and the periphery of the attachment mechanism is compact.

SUMMARY

The various embodiments of the invention described herein are made in view of the above-described problem, and an object is to provide an airbag module equipped seat having high attachment rigidity when a guide member for guiding the deployment direction of an airbag module is attached to the airbag module by using an attachment member.

Another object is to provide an airbag module equipped seat in which a guide member for guiding the deployment direction of an airbag module is attached to the airbag module by using an attachment member and which has features that attachment workability is good, the separation of the attachment member hardly occurs, the periphery of an attachment mechanism is compactly stored in a cushion pad, and the periphery of the attachment mechanism is compact.

According to an airbag module equipped seat of a first embodiment, the above-described problem is solved by a seat comprising: a side frame that extends along a side portion of the seat; an airbag module for storing an airbag, the airbag module being attached to the side frame; and a guide member that is attached to a trim cover of the seat and guides a deployment of the airbag in a deployment direction, wherein the side frame includes a plurality of side frame elements that extend along the side portion of the seat and are connected to each other in at least one position while facing each other, and wherein the guide member is attached to the side frame.

In this way, since the guide member is attached to the side frame including the plurality of side frame elements extending along the side portion of the seat, facing each other, and connected to each other in at least one position, the guide member may be attached to the side frame including the plurality of side frame elements connected to each other in at least one position, and hence the guide member may be attached by a compact configuration.

In a second embodiment, the side frame may include a concave portion used to attach the guide member thereto, and the guide member may be connected to an attachment member that includes a connecting portion connected to one-side end of the guide member and a connection portion connected to the concave portion of the side frame.

In this way, since the attachment member is connected to the concave portion, the attachment member may be compactly disposed.

Further, since the guide member is connected to the attachment member including the connecting portion connected to one-side end of the guide member and the connection portion locked to the concave portion of the side frame, only the concave portion may be formed in the side frame, and hence a change in the shape of the side frame equipped with the guide member may be minimized.

Further, since the attachment member includes the connecting portion connected to one-side end of the guide member and the connection portion connected to the concave portion of the side frame, the side frame and the guide member may be reliably and promptly fastened to each other.

Moreover, since the attachment member is connected to the side frame by the connection to the concave portion, the position of the attachment target is defined in the up and down direction and the right and left direction by the concave portion, and hence the attachment target position may be easily designed. Further, the disengagement of the attachment member with respect to the attachment target hardly occurs in the attachment state, and hence a separate positioning structure does not need to be provided.

In a third embodiment, the side frame may be formed in a hollow closed section structure with a pair of walls connecting a pair of the side frame elements at front and rear sides of the seat, and the concave portion may be an attachment hole.

In this way, since the side frame with a hollow closed section structure includes the attachment hole for attaching the guide member, the guide member may be attached to the side frame having a hollow closed section structure, and hence the guide member may be compactly attached.

In a fourth embodiment, the seat further comprises a rotation suppressing portion that suppresses rotation of the attachment member with respect to the side frame located between the attachment member and the side frame.

The attachment member may easily rotate by a large force generated by the deployment of the airbag. However, since the rotation suppressing portion that suppresses the rotation of the attachment member relative to the side frame is provided between the attachment member and the side frame, the rotation of the attachment member is suppressed even when the attachment member is used for the connection between the guide member and the side frame.

In a fifth embodiment, the attachment member may include a retaining portion that suppresses the disengagement of the attachment member from the attachment hole.

With such a configuration, the separation of the attachment member from the attachment hole may be suppressed even when the attachment member is used for the connection between the guide member and the side frame.

In a sixth embodiment, one-side end of the guide member may be stored in a space surrounded by the side frame elements of the side frame.

With such a configuration, since the interference between one-side end of the guide member and the other component is suppressed, the separation of the guide member from the side frame or the damage of one-side end side of the guide member may be suppressed.

In a seventh embodiment, each of the pair of the side frame elements may include an outer wall which is located at an outside of the seat to attach the airbag module thereto and an inner wall which is located at an inside of the seat to face the outer wall, and each of the pair of walls may include front and rear walls which are located at the front side and the rear side of the seat to connect the inner wall and the outer wall to each other. Further, the attachment hole may be formed in the inner wall of the side frame, and the connection portion of the attachment member may be a groove that sandwiches the wall at the front side of the seat in the attachment hole.

In this way, since the attachment hole is formed in the inner wall facing the outer wall equipped with the airbag module, a predetermined space may be formed between the airbag module and the attachment member, and hence the deployment direction of the airbag may be more stably guided during the deployment of the airbag by the guide member.

In an eighth embodiment, the attachment member may include an outer wall contact surface which comes into contact with an inner surface of the outer wall of the side frame and a front wall contact surface which comes into contact with an inner wall of the front wall of the side frame, and the retaining portion may be formed as a protrusion that comes into contact with an inner surface of a rear end of the attachment hole.

With such a configuration, the separation of the attachment member may be suppressed particularly during the deployment of the airbag.

In a ninth embodiment, the attachment hole may be formed at a position where the plurality of facing side frame elements are connected to each other, and the connection portion of the attachment member may be a groove that sandwiches a wall of the airbag module attachment side surface of the attachment hole.

In this way, since the attachment hole is formed at the frame connection position having high rigidity, the attachment member may be attached to a highly rigid position, and hence the attachment member support rigidity is improved.

In a tenth embodiment, the connecting portion may be formed as a retaining space that separably retains the one-side end of the guide member therein, the attachment member may include a slit that extends from the retaining space to an outer surface of the attachment member and communicates with the retaining space to form a passage of the guide member, an outer wall contact surface that forms an outer wall of the retaining space and comes into contact with the inner surface of the outer wall of the side frame, and an upright wall that is uprightly formed from the outer wall contact surface toward the inner wall of the side frame and forms an outer wall of the slit, and a portion that is continuous from the outer wall contact surface to the upright wall may be stored in a hollow space inside the side frame.

In this way, since a portion continuous to the upright wall from the outer wall contact surface forming a portion from the retaining space as the passage of the guide member to the slit is stored in the hollow space inside the side frame, the interference of the passage of the guide member with respect to the other component is suppressed, and hence the damage of the guide member may be suppressed.

In an eleventh embodiment, a plurality of the attachment holes may be provided.

With such a configuration, since the guide member may be connected to a plurality of positions of the side frame having a closed section structure, the deployment direction of the airbag may be more stably guided by the guide member during the deployment of the airbag.

According to the first embodiment, since the side frame including the plurality of side frame elements extending along the side portion of the seat, facing each other, and connected to each other in at least one position includes the concave portion used to attach the guide member, the guide member may be attached to the side frame having a hollow closed section structure, and hence the guide member may be attached by a compact configuration.

According to the second embodiment, since the attachment member is connected to the concave portion, the attachment member may be compactly disposed.

Further, since the guide member is connected to the attachment member including the connecting portion connected to one-side end of the guide member and the connection portion locked to the concave portion of the side frame, a change in the shape of the side frame equipped with the guide member may be minimized.

Further, since the attachment member includes the connecting portion connected to one-side end of the guide member and the connection portion connected to the concave portion of the side frame, the side frame and the guide member may be reliably and promptly fastened to each other.

Moreover, since the attachment member is connected to the side frame by the connection to the concave portion, the position of the attachment target is defined in the up and down direction and the right and left direction by the concave portion, and hence the attachment target may be easily designed. Further, the disengagement of the attachment member with respect to the attachment target hardly occurs in the attachment state, and hence a separate positioning structure does not need to be provided.

According to the third embodiment, since the side frame with a hollow closed section structure includes the attachment hole for attaching the guide member, the guide member may be attached to the side frame having a hollow closed section structure, and hence the guide member may be compactly attached.

According to the fourth embodiment, the attachment member may easily rotate by a large force generated by the deployment of the airbag. However, since the rotation suppressing portion that suppresses the rotation of the attachment member relative to the side frame is provided between the attachment member and the side frame, the rotation of the attachment member is suppressed even when the attachment member is used for the connection between the guide member and the side frame.

According to the fifth embodiment, the separation of the attachment member from the attachment hole may be suppressed even when the attachment member is used for the connection between the guide member and the side frame.

According to the sixth embodiment, since the interference between one-side end of the guide member and the other component is suppressed, the separation of the guide member from the side frame or the damage of one-side end side of the guide member may be suppressed.

According to the seventh embodiment, since the attachment hole is formed in the inner wall facing the outer wall equipped with the airbag module, a predetermined space may be formed between the airbag module and the attachment member, and hence the deployment direction of the airbag may be more stably guided during the deployment of the airbag by the guide member.

According to the eighth embodiment, the separation of the attachment member may be suppressed particularly during the deployment of the airbag.

According to the ninth embodiment, since the attachment hole is formed at the frame connection position having high rigidity, the attachment member may be attached to a highly rigid position, and hence the attachment member support rigidity is improved.

According to the tenth embodiment, since a portion continuous to the upright wall from the outer wall contact surface forming a portion from the retaining space as the passage of the guide member to the slit is stored in the hollow space inside the side frame, the interference of the passage of the guide member with respect to the other component is suppressed, and hence the damage of the guide member may be suppressed.

According to the eleventh embodiment, since the guide member may be connected to a plurality of positions of the side frame having a closed section structure, the deployment direction of the airbag may be more stably guided by the guide member during the deployment of the airbag.

DETAILED DESCRIPTION

A structure of an attachment portion which attaches an end of a guide member for guiding the deployment direction of an airbag module to an attachment target is described below.

The guide member is a sheet member that has a limited stretchable property compared to a skin material. An example of the guide member includes a stay cloth of which one-side end is sewn to a fracture portion formed in a skin material or the like at a position for storing an airbag module and which transmits a force generated by the deployment of an airbag to the fracture portion to promote the deployment of the airbag or a stay cloth which is disposed between the airbag module and the other component so that the other component, such as a cushion pad, is not damaged by a force generated by the expansion of the airbag during the deployment of the airbag.

Hereinafter, an airbag module equipped seat according to the embodiment will be described with reference to FIGS. 1 to 10.

Figure 1:
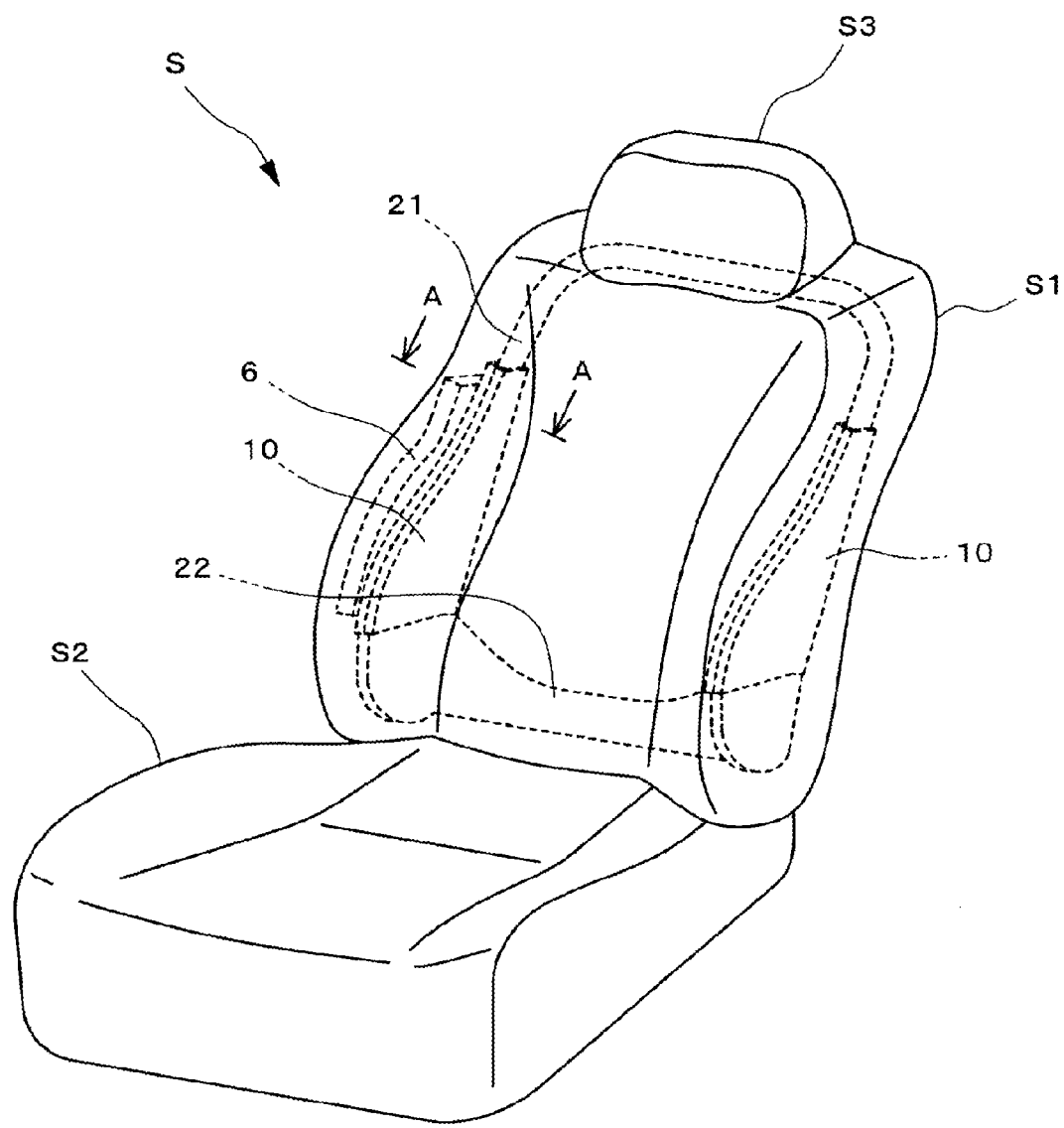
FIG. 1 is a perspective view illustrating an appearance of an airbag module equipped seat according to an embodiment.

An airbag module equipped seat S according to this embodiment includes a seat back S1, a seat portion S2, and a headrest S3 as illustrated in FIG. 1.

Figure 2:
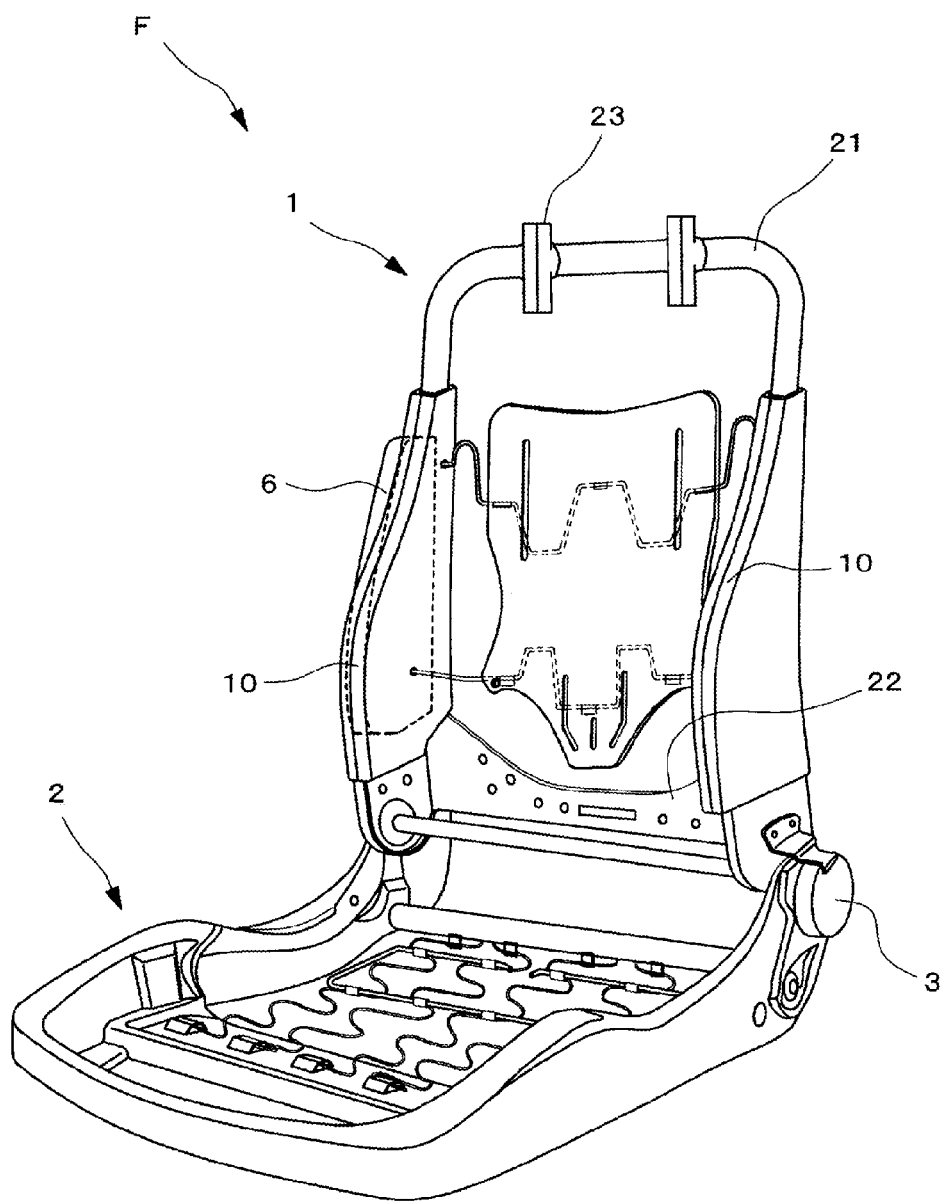
FIG. 2 is a perspective view illustrating a seat frame of the airbag module equipped seat according to the embodiment.

A seat frame F illustrated in FIG. 2 is provided inside the airbag module equipped seat S. The seat frame F includes a seat back frame 1 as a frame of the seat back S1 and a seat frame 2 as a frame of the seat portion S2. The seat frame 2 and the seat back frame 1 are connected to each other through a reclining mechanism 3. The seat back S1 and the seat portion S2 are formed by providing a cushion and a trim cover at the outside of the seat back frame 1 and the seat frame 2.

As illustrated in FIGS. 1 to 4, the seat back S1 mainly includes the seat back frame 1, a cushion pad 5 which is placed on the seat back frame 1, a trim cover 4 which covers the seat back frame 1 and the cushion pad 5, and a stay cloth 32 of which one-side end is sewn to a fracture portion 40 of the trim cover 4.

As illustrated in FIGS. 1 and 2, the seat back frame 1 is formed in a frame shape by including the side frames 10 which are separated from each other in the right and left direction and extend in the up and down direction, an upper frame 21 which connects the upper ends of the side frame 10 to each other, and a lower frame 22 which connects the lower ends thereof to each other.

The upper frame 21 is provided with a pillar support portion 23, and the pillar support portion 23 is provided with a headrest frame (not illustrated). The headrest S3 is formed by providing a cushion member at the outside of the headrest frame.

Figure 3:
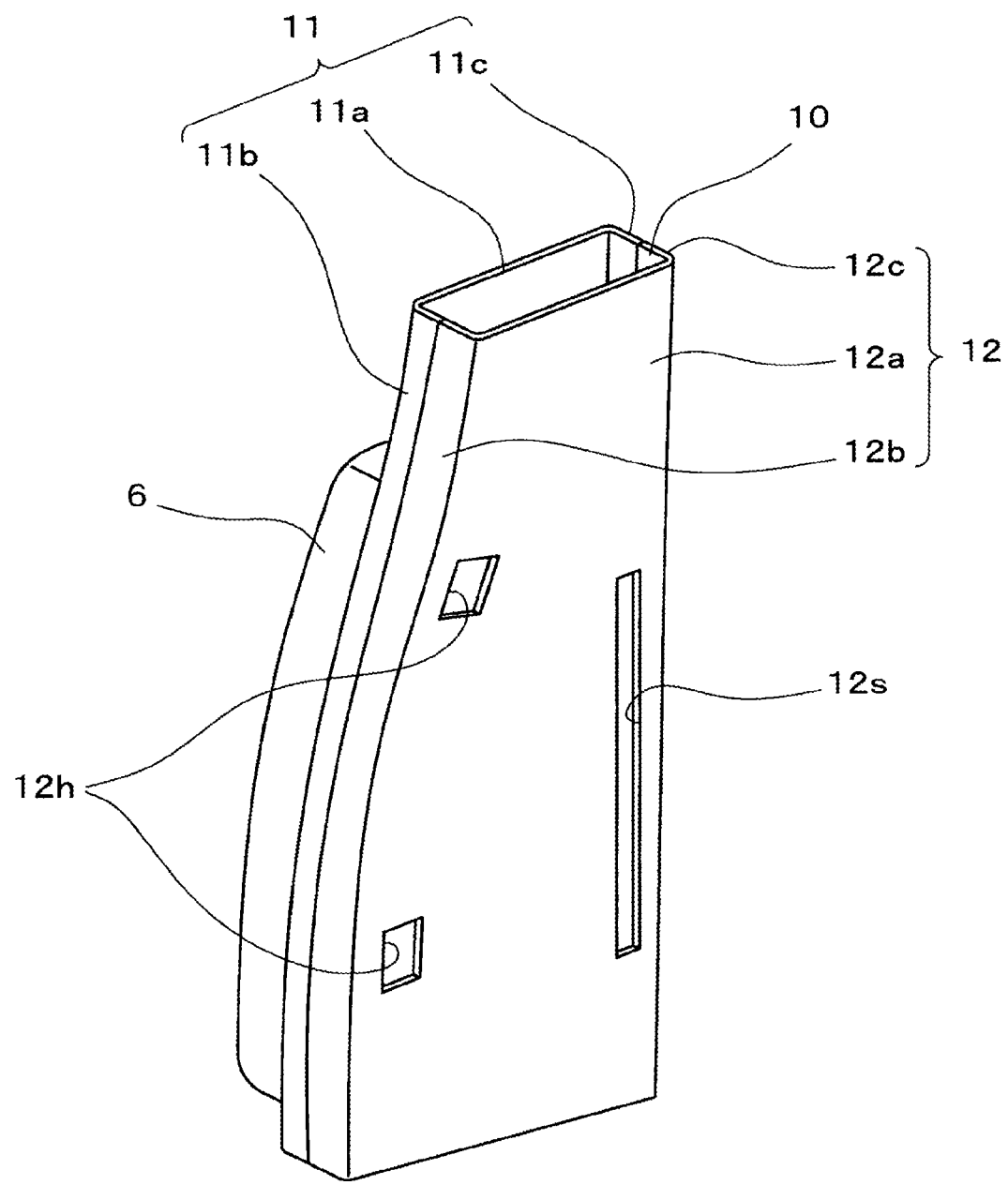
FIG. 3 is a perspective view illustrating a side frame according to the embodiment.
Figure 4:
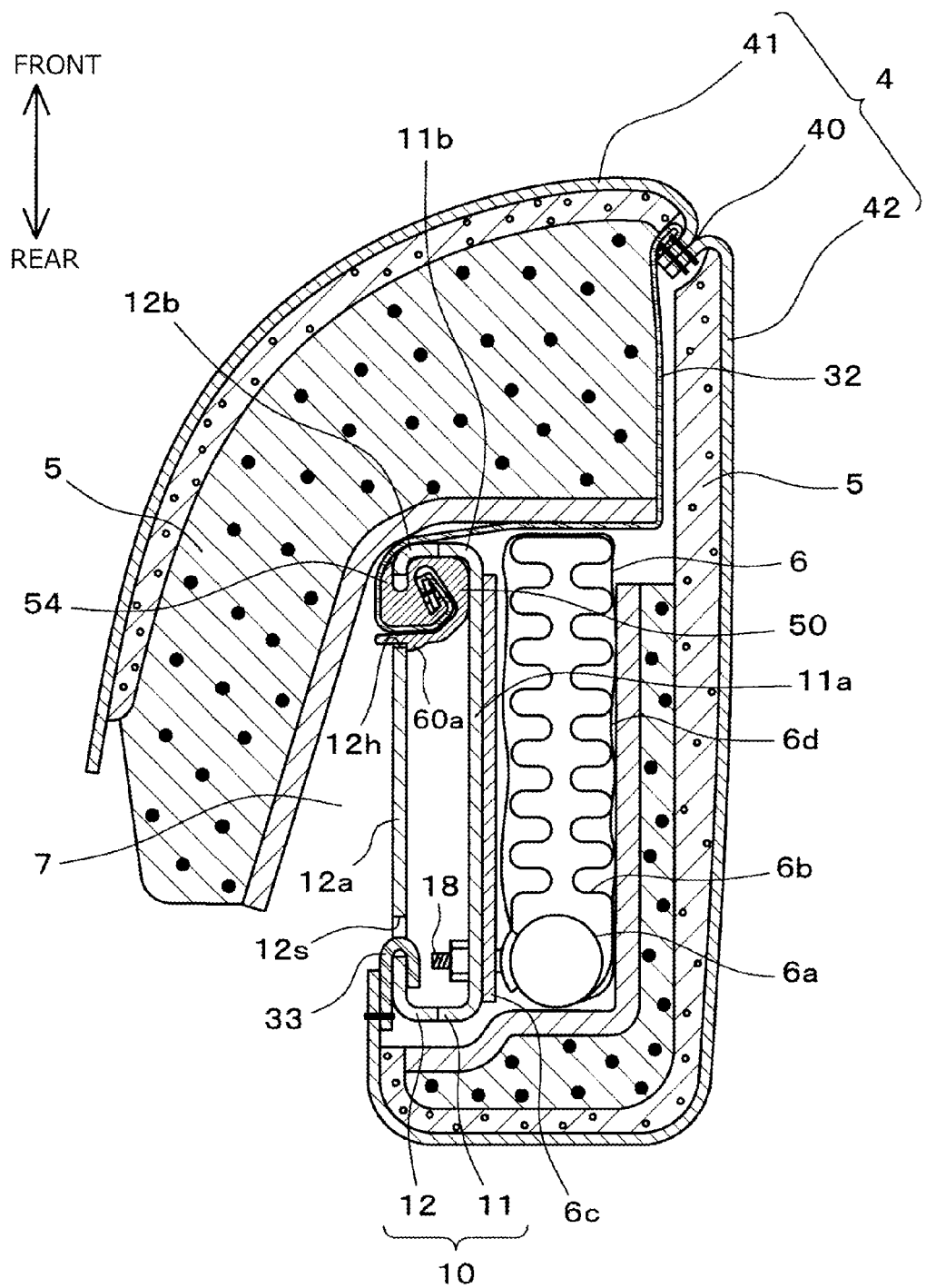
FIG. 4 is a cross-sectional view taken along the line A-A of FIG. 1.

As illustrated in FIGS. 3 and 4, the side frame 10 includes an outer frame 11 and an inner frame 12 which are formed to have a shallow U-shaped cross-section.

As illustrated in FIGS. 3 and 4, each of the outer frame 11 and the inner frame 12 is formed of a resin molding material, and is formed to have a shallow U-shaped cross-section in which front walls 11b and 12b and rear walls 11c and 12c are uprightly formed in the perpendicular direction from the front and rear ends of plate-like outer and inner walls 11a and 12a. As illustrated in FIG. 3, in the outer wall 11a and the inner wall 12a, the rear edges continuous to the rear walls 11c and 12c are perpendicular to the upper edge and the lower edge, and the front edges continuous to the front walls 11b and 12b protrude forward, so that the upper ends thereof move away from the rear walls 11c and 12c in relation to the lower ends thereof.

The end surfaces of the front wall 11b of the outer frame 11 and the front wall 12b of the inner frame 12 and the end surfaces of the rear wall 11c of the outer frame 11 and the rear wall 12c of the inner frame 12 are fixed to one another while coming into contact with one another, and the outer frame 11 and the inner frame 12 form the side frame 10 having a hollow closed section structure, as a whole.

Furthermore, in this embodiment, the side frame 10 is formed of a resin molding material, but a structure may be employed in which the outer frame 11 and the inner frame 12 are formed by bending a metallic plate and the end surfaces of the front wall 11b of the outer frame 11 and the front wall 12b of the inner frame 12 and the end surfaces of the rear wall 11c of the outer frame 11 and the rear wall 12c of the inner frame 12 are welded and fixed to one another in an abutting state.

A space which is surrounded by the outer wall 11a, the inner wall 12a, the front walls 11b and 12b, and the rear walls 11c and 12c corresponds to a hollow space inside the side frame of embodiments and a space surrounded by the frame of the side frame. Further, the outer frame 11 and the inner frame 12 correspond to the plurality of side frame elements of embodiments, and the front walls 11b and 12b and the rear walls 11c and 12c correspond to the positions where the plurality of side frame elements of embodiments are connected to one another.

A rectangular attachment hole 12h is provided at two positions close to the front wall 12b in the inner wall 12a of the inner frame 12. Although it is difficult to form an elongated hole along a curved edge like the side end edge of the front wall 12b of the inner wall 12a, the attachment hole may be simply formed in that the attachment hole 12h is not formed as an elongated hole and short rectangular holes are formed at a plurality of positions.

An elongated hole 12s which extends in parallel to the rear wall 12c is formed in the vicinity of the center of the side frame 10 in the length direction at a position close to the rear wall 12c. Since the side end edge of the rear wall 12c of the inner wall 12a has a linear shape and a continuous elongated hole may be easily formed, the attachment hole near the rear wall 12c is formed as a continuous elongated hole.

In this way, since an attachment target of an attachment member 50 is formed as a hole, it is possible to minimize a change in the shape of the side frame used to attach the guide member.

In this embodiment, the attachment holes 12h are formed in parallel to each other in the extension direction of the front wall 12b substantially corresponding to the up and down direction of the seat S, but the present invention is not limited thereto.

A configuration may be employed in which an outer stay cloth (not illustrated) is provided to pass between the rear surface of the airbag module 6 and the rear cushion pad 5 other than the stay cloth 32, a pair of attachment holes like the attachment holes 12h is provided at two positions close to the rear wall 12c of the inner wall 12a instead of the elongated hole 12s of the side frame 10, and the outer stay cloth is attached to the attachment holes through the attachment member 50. In this case, the pair of attachment holes 12h is formed in parallel to each other even in the front to back direction of the seat S.

The attachment holes 12h are formed at the positions where the width of the inner wall 12a in the front to back direction of the seat S is wider than that of the vicinity of the upper end instead of the vicinity of the upper end of the side frame 10 having a narrow width in the front to back direction of the seat S. With such a configuration, since the attachment holes 12h are formed at the positions with a large space, a space may be effectively used and an increase in the size of the attachment position of the stay cloth 32 may be suppressed.

The width of the attachment hole 12h in the front to back direction of the seat S is set to be larger than the width of the elongated hole 12s in the front to back direction of the seat S.

The outer wall 11a of the side frame 10 is provided with attachment holes for the other components like bolt holes to which bolts 18 for fixing the airbag module 6 are attached, but the attachment holes 12h and the elongated hole 12s are formed at different positions from these other attachment holes in the front to back direction of the seat S. With such a configuration, degradation in the rigidity of the side frame 10 may be suppressed.

Further, as illustrated in FIG. 4, in this embodiment, the bolt 18 is provided at a position close to the elongated hole 12s. For this reason, when a locking member 33 is loosened, the locking member 33 comes into contact with the bolt 18, and hence the separation of the locking member 33 is suppressed. Furthermore, a configuration may be employed in which the bolt 18 is provided at a position close to the attachment hole 12h to suppress the separation of the attachment member 50.

Furthermore, a rib which extends in the length direction of the front wall 12b may be formed at the slightly rear position of the seat S than two attachment holes 12h on the surface facing the outer wall 11a in the inner wall 12a. For example, the rib may be formed as an elongated protrusion having a rectangular cross-section. In this way, since the rib is formed, the rigidity in the vicinity of the attachment hole 12h may be improved.

The airbag module 6 is fixed to the side frame 10.

The airbag module 6 of this embodiment is formed as a caseless airbag module without a module case. As illustrated in FIG. 4, the airbag module 6 includes an inflator 6a, a folded airbag 6b, a retainer 6c which retains the inflator 6a, and a wrapping material 6d which wraps the airbag 6b.

The outer peripheral portion of the inflator 6a is fixed to the retainer 6c and the side frame 10 by the bolt 18 which is uprightly formed toward the inside of the seat S.

The inflator 6a is disposed inside the airbag 6b, and the airbag 6b is deployed toward the front side of the seat S by a gas discharged from the inflator 6a.

The airbag 6b is retained in a folded state by the wrapping material 6d formed as a cloth bag, and the wrapping material 6d is easily torn when the airbag 6b is deployed.

Furthermore, in this embodiment, the airbag module 6 is formed in a caseless type, but the present invention is not limited thereto. For example, an airbag module with a module case may be provided.

As illustrated in FIG. 4, the cushion pad 5 is provided with a space 7 for storing the airbag module 6.

Figure 5:
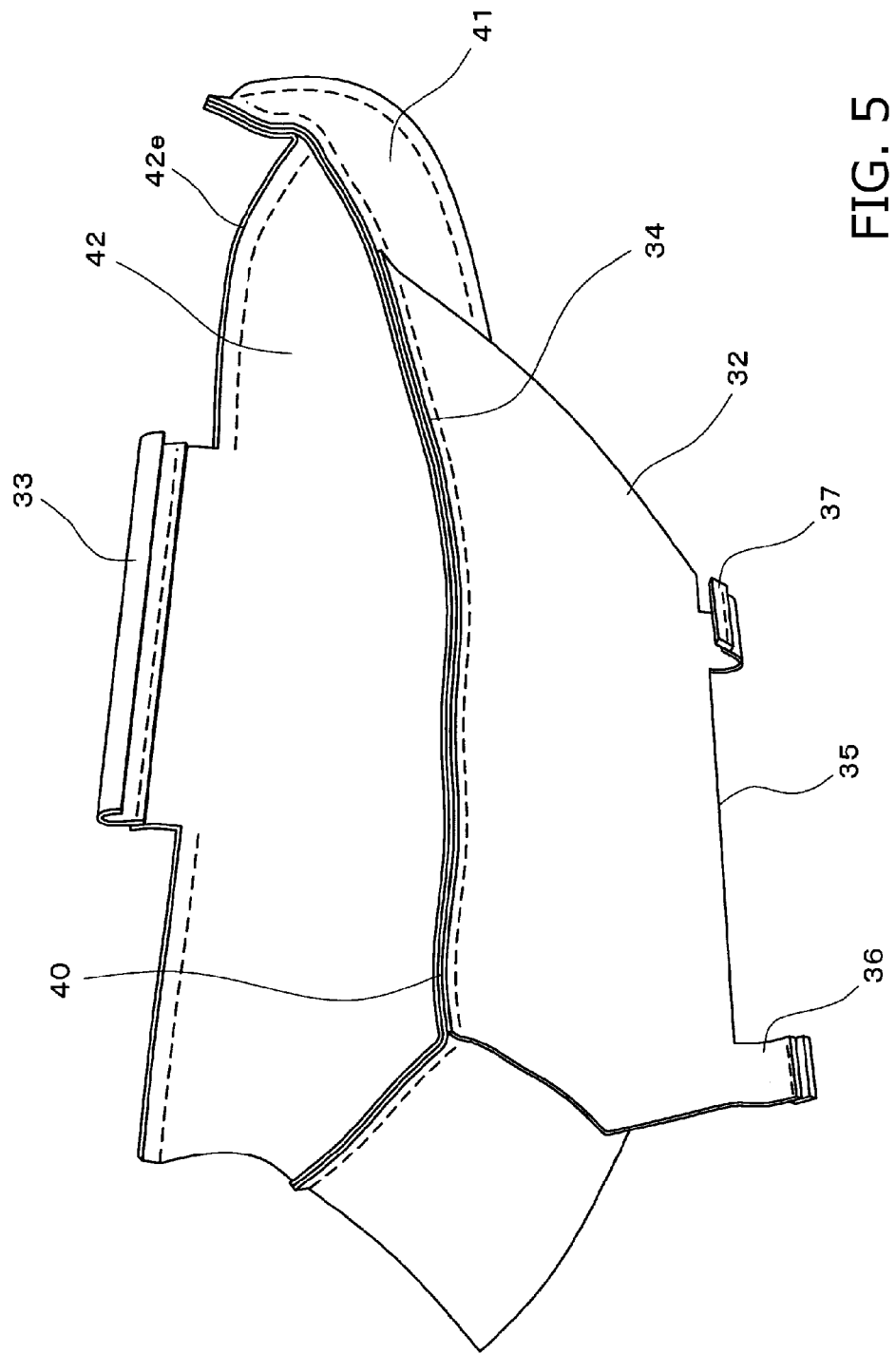
FIG. 5 is an explanatory perspective view illustrating a state where a trim cover and a stay cloth according to the embodiment are sewn together at a fracture portion.

The trim cover 4 is formed of a known material, and is sewn in a bag shape by sewing a front surface gusset portion 41 enclosing right and left bank surfaces from the center of the seat surface to a side surface gusset portion 42 reaching a back surface from a peripheral surface and further connecting a back surface gusset portion (not illustrated) to the side surface gusset portion 42 to be openable and closeable by a slider fastener (not illustrated) as illustrated in FIGS. 4 and 5.

The trim cover 4 is provided with the fracture portion 40 which is formed at the bulged peak points of the bank portions of the front surface gusset portion 41 and the side surface gusset portion 42. The fracture portion 40 sews the ends of the front surface gusset portion 41 and the side surface gusset portion 42 to each other so that the fracture portion may be broken by a tensile force generated by the expansion of the airbag while the strength endurable for the normal use is maintained.

As illustrated in FIG. 5, an end edge 42e opposite to the fracture portion 40 in the side surface gusset portion 42 is formed so that an area in the vicinity of the center thereof is longer than an area at both sides thereof, and the elongated locking member 33 formed of a resin material and having a substantially J-shaped cross-section is sewn thereto. The locking member 33 is used to lock the center area of the end edge 42e to the elongated hole 12s of the side frame 10.

Further, the stay cloth 32 is sewn to the fracture portion 40.

The stay cloth 32 is formed of a less stretchable cloth material, and is used to transmit a stress generated by the expansion of the airbag to the fracture portion 40. The stay cloth 32 corresponds to the guide member of embodiments.

As illustrated in FIG. 5, the stay cloth 32 is formed as a substantially trapezoid cloth so that an edge 34 near the fracture portion 40 is substantially parallel to an edge 35 facing the fracture portion 40 and the edge 34 near the fracture portion 40 is long. A plurality of attachment portions 36 used to attach trim plates 37 protruding in a rectangular shape are provided in the vicinity of both ends of the edge 35 facing the fracture portion 40.

The trim plate 37 is a rectangular plate body which is formed of a rigid resin material. The trim plate 37 is a stay cloth end shape maintaining member that is used to maintain the shape of the end of the attachment portion 36 of the stay cloth 32. Since the trim plate 37 is fixed to the end of the stay cloth 32, it is possible to improve the workability when the end of the stay cloth 32 is inserted into a locking part 55. In this embodiment, the trim plate 37 is fixed to the attachment portion 36 of the stay cloth 32, but the present invention is not limited thereto. For example, the trim plate 37 may not be used, and a portion which is formed by folding the end of the attachment portion 36 of the stay cloth 32 a plurality of times and sewing the folded portion or a portion which is formed by winding the end of the attachment portion as a plurality of plies and sewing the plies may be inserted into the locking part 55 of the attachment member 50 while one side of the portion is crushed.

As illustrated in FIG. 4, the stay cloth 32 is pulled into the space 7 from the fracture portion 40. The trim plate 37 which is fixed to the attachment portion 36 of the stay cloth 32 is locked to the attachment hole 12h of the inner wall 12a of the inner frame 12 through the attachment member 50.

Further, the locking member 33 which is sewn to the center area of the end edge 42e opposite to the fracture portion 40 in the side surface gusset portion 42 is locked to the elongated hole 12s of the inner wall 12a in the inner frame 12.

Figure 6:
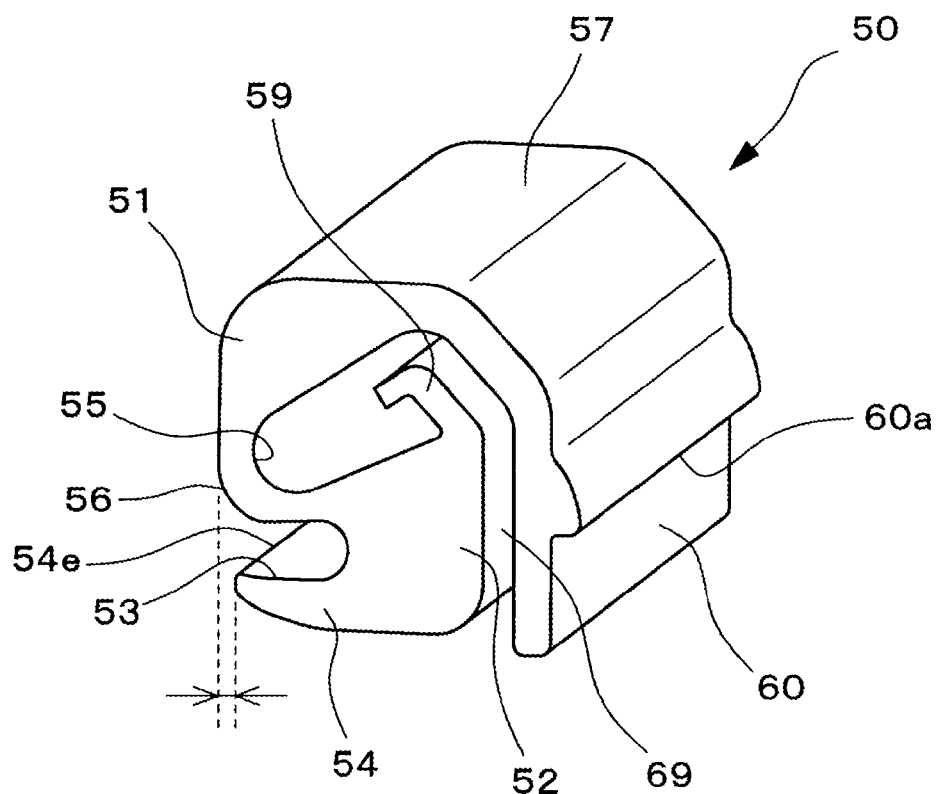
FIG. 6 is a perspective view illustrating an attachment member according to the embodiment.

The attachment member 50 is integrally formed of a rigid resin. As illustrated in FIG. 6, the attachment member includes a wide portion 51 which has a substantially rectangular cross-sectional shape substantially following a shape of an inner surface of a portion having a J-shaped cross-section reaching the rear wall 11a while passing from the inner wall 12a of the side frame 10 to the front walls 12b and 11b, a locking portion 52 which is formed near the inner wall 12a in the wide portion 51, and an extension portion 54 which is formed, so that the end opposite to the wide portion 51 in the locking portion 52 extends toward the extension side of the stay cloth 32 and is covered by the outer surface of the inner wall 12a at the inside of the seat S. The attachment member 50 has a substantially uniform cross-sectional shape in the extension direction of the side frame 10.

In the locking portion 52, a groove 53 which extends from the wide portion 51 to lock the attachment member 50 to the inner wall 12a is formed at the side of the inner wall 12a of the wide portion 51. The groove 53 is formed as a space between the wide portion 51 and the extension portion 54 extending from the base portion of the wide portion 51. The groove 53 is attached to the end of the attachment hole 12h at the front side of the seat S, and sandwiches the inner wall 12a.

The wide portion 51 includes a front wall contact surface 56 which is perpendicular to the depth direction of the groove 53 and a rear wall contact surface 57 which is perpendicular to the front wall contact surface 56 and is parallel to the depth direction of the groove 53.

The wide portion 51 includes the locking part 55 which locks the trim plate 37 while retaining the trim plate therein and first and second walls 59 and 60 which form both wall surfaces of a slit 69 used as a passage for the stay cloth 32 drawn out from the locking part 55. The second wall 60 corresponds to the upright wall of the embodiments.

The outer surface of the second wall 60 is parallel to the front wall contact surface 56 and is perpendicular to the rear wall contact surface 57. The outer surface of the second wall 60 is provided with a protrusion 60a of which a portion near the rear surface contact surface 57 protrudes outward and which serves as a step. The protrusion 60a extends from the upper end of the attachment member 50 to the lower end thereof, and is formed in a linear shape in the side view.

The locking part 55 is formed as a space with a size in which the trim plate 37 may be locked thereinto, and is formed as an opening of which upper and lower ends are opened and which extends from the upper end to the lower end.

Furthermore, the locking part 55 may be formed so that only one of the upper end and the lower end is opened. In an embodiment, only the upper end may be opened, and the other-side end thereof may be closed. The attachment member 50 of which the upper end of the locking part 55 is opened and the lower end thereof is closed is particularly suitable for the case where the attachment member is used only for any one of the right and left side frames 10. The attachment member 50 of which both the upper end and the lower end of the locking part 55 are opened are particularly suitable for the case where the attachment member is used for both right and left side frames 10. At this time, the upper end side when the attachment is used for one of the right and left side frames 10 becomes the lower end side when the attachment member is used for the other side frame 10.

The groove 53 and the extension portion 54 are perpendicular to the front wall contact surface 56 and the second wall 60, and are parallel to the rear wall contact surface 57. The front wall contact surface 56 is parallel to the second wall 60, and is perpendicular to the rear wall contact surface 57. Further, the inner wall 12a stored in the groove 53 and the trim plate 37 stored in the locking part 55 during the assembly are inclined relative to each other while an obtuse angle is formed therebetween.

The front wall contact surface 56, the rear wall contact surface 57, and the protrusion 60a correspond to the rotation suppressing portions of embodiments, and the groove 53 and the protrusion 60a correspond to the retaining portions of embodiments.

Since the retaining portion is formed by the protrusion 60a, the retaining structure may be integrally formed with the attachment member 50. Accordingly, the manufacturing process may be easily performed and the rigidity of the second wall 60 and the protrusion 60a is improved.

As illustrated in FIG. 6, an end 54e of the extension portion 54 is located at a position lower than the front wall contact surface 56 in the depth direction of the groove 53. In this way, a portion exposed to the outside of the side frame 10 in the locking portion 52 is shorter than a portion stored in the side frame 10 in the depth direction of the groove 53, and hence a portion which may interfere with the cushion pad 5 disposed at the inside of the side frame 10 at the front side of the seat S is shortened.

As illustrated in FIG. 4, the attachment member 50 is attached to the side frame 10 in a manner such that the attachment member is inserted into the attachment hole 12h while the trim plate 37 to which the end of the stay cloth 32 is sewn is retained inside the locking part 55.

At this time, a portion near the rear wall contact surface 57 in relation to the groove 53 and the protrusion 60a in the attachment member 50 is stored in the space inside the side frame 10.

Further, the front wall contact surface 56 comes into contact with the rear surfaces of the front walls 12b and 11b, the rear wall contact surface 57 comes into contact with the surface of the outer wall 11a at the inside of the seat S, and the protrusion 60a comes into contact with the end of the attachment hole 12h at the rear side of the seat S in the surface of the inner wall 12a at the outside of the seat S. In this way, since the front wall contact surface 56 comes into contact with the rear surfaces of the front walls 12b and 11b and the rear wall contact surface 57 comes into contact with the surface of the outer wall 11a at the inside of the seat S, it is possible to suppress the rotation of the attachment member 50 about the end of the attachment hole 12h at the front side of the seat S.

Furthermore, in this embodiment, the protrusion 60a and the second wall 60 come into contact with the end of the attachment hole 12h at the rear side of the seat S, but a gap may be formed between the second wall 60 and the end of the attachment hole 12h at the rear side of the seat S.

Further, in this embodiment, the attachment hole 12h used to attach the stay cloth 32 is formed in the inner frame 12. However, a configuration may be employed in which the attachment hole is provided at a position close to the front wall 11b of the outer wall 11a of the outer frame 11 and the attachment member 50 connected to the stay cloth 32 is attached to the outer frame 11.

Further, in this embodiment, the guide member that guides the deployment direction of the airbag module 6 is provided only for the inner stay cloth 32 passing through the front side of the airbag module 6. However, as another example of the guide member, a configuration may be employed in which an outer stay cloth (not illustrated) passing between the rear surface of the airbag module 6 and the rear cushion pad 5 is provided, a pair of attachment holes like the attachment holes 12h is provided at two positions close to the rear wall 12c of the inner wall 12a instead of the elongated hole 12s of the side frame 10, and the outer stay cloth is attached to the attachment holes through the attachment member 50.

In this case, one-side end of the outer stay cloth is sewn to the fracture portion 40, the outer stay cloth is drawn from the fracture portion 40 into the space 7, and the outer stay cloth is drawn from the surface of the airbag module 6 at the outside of the seat S along the surface at the rear side of the seat S to the rear walls 11c and 12c of the side frame 10 while facing the airbag module 6. The end opposite to the fracture portion 40 is provided with an attachment portion (not illustrated) like the attachment portion 36, and a trim plate (not illustrated) is sewn thereto.

Further, a configuration may be employed in which the attachment hole for attaching the outer stay cloth is provided at a position close to the rear wall 11c of the outer wall 11a of the outer frame 11 and the attachment member 50 connected to the outer stay cloth is attached to the outer frame 11.

The attachment of the stay cloth 32 with respect to the side frame 10 through the attachment member 50 is performed according to the following procedure.

An operator first folds the attachment portion 36 of the stay cloth 32 once at the boundary between the trim plate 37 and the attachment portion 36, and causes the trim plate 37 and the attachment portion 36 to overlap each other by the width of the trim plate 37.

Next, the attachment portion 36 is inserted into the slit 69 while the trim plate 37 and the attachment portion 36 are held. Next, the trim plate 37 is inserted and pressed into the locking part 55 so that the trim plate 37 having the stay cloth 32 attached thereto is connected to the attachment member 50.

The attachment members 50 are connected to all attachment portions 36 by performing the same operation repeatedly on all attachment portions 36.

Next, the wide portion 51 of the attachment member 50 is inserted into the attachment hole 12h of the side frame 10, and the groove 53 is locked to the wall of the attachment hole 12h at the front side of the seat S. The second wall 60 is pressed into the attachment hole 12h, and the protrusion 60a is caused to come into contact with the wall of the attachment hole 12h at the rear side of the seat, so that the attachment member 50 is positioned.

The attachment of the stay cloth 32 with respect to the side frame 10 through the attachment member 50 is completed by performing the above-described operation on all attachment members 50.

Figure 7:
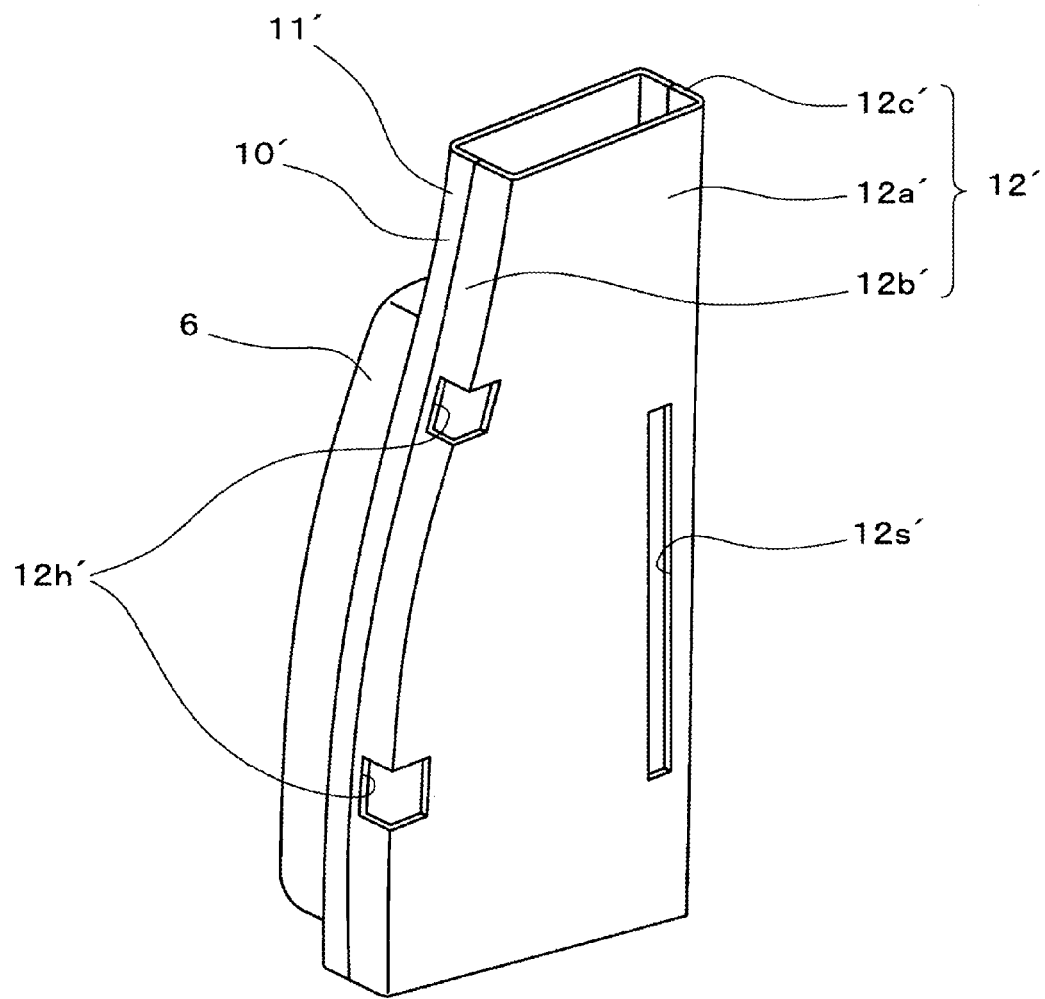
FIG. 7 is a perspective view illustrating a side frame according to another embodiment.
Figure 8:
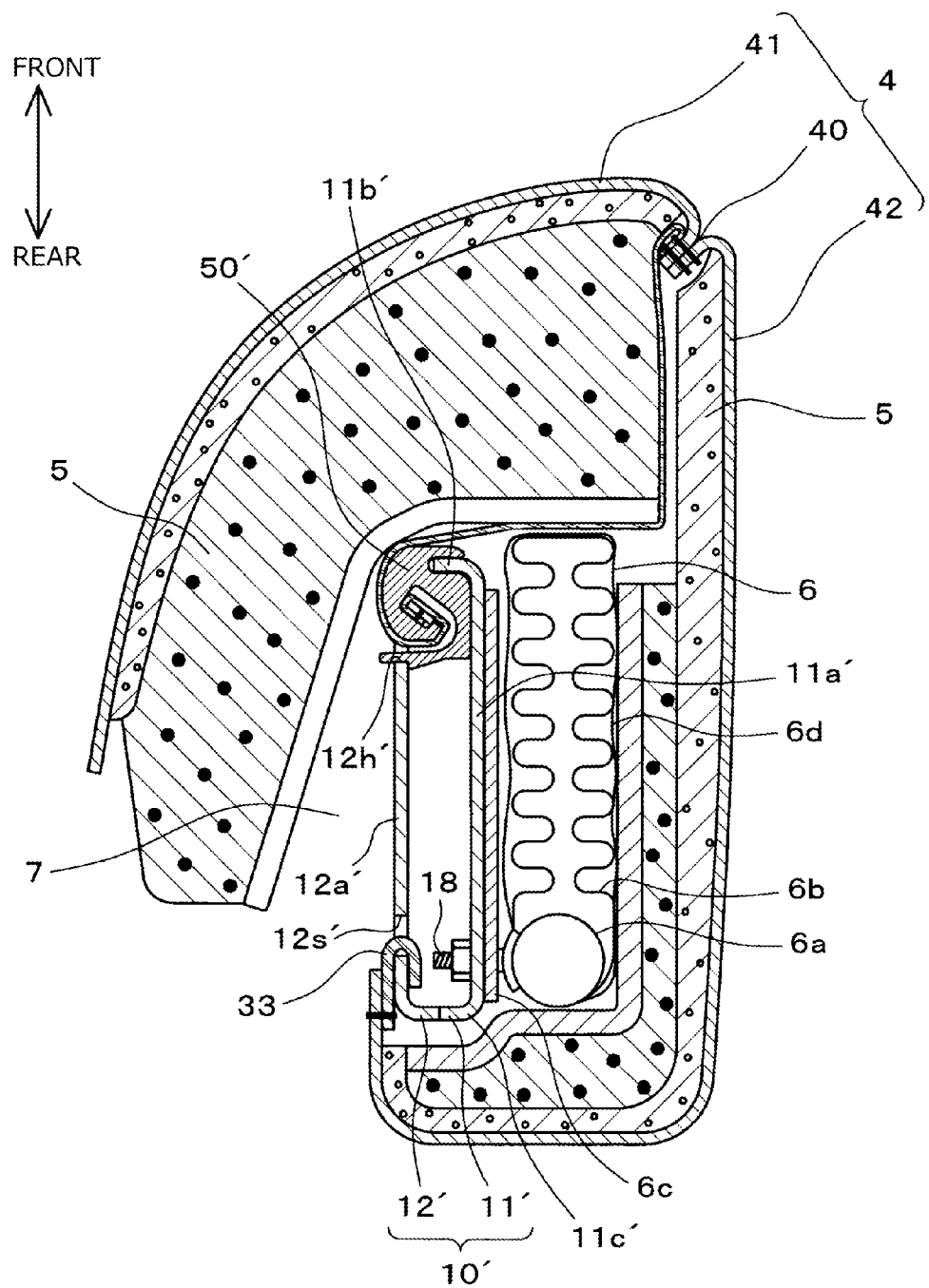
FIG. 8 is a cross-sectional view taken along the line A-A of FIG. 1 and is an explanatory view illustrating the case where a side frame and an attachment member according to another embodiment are used.
Figure 9:
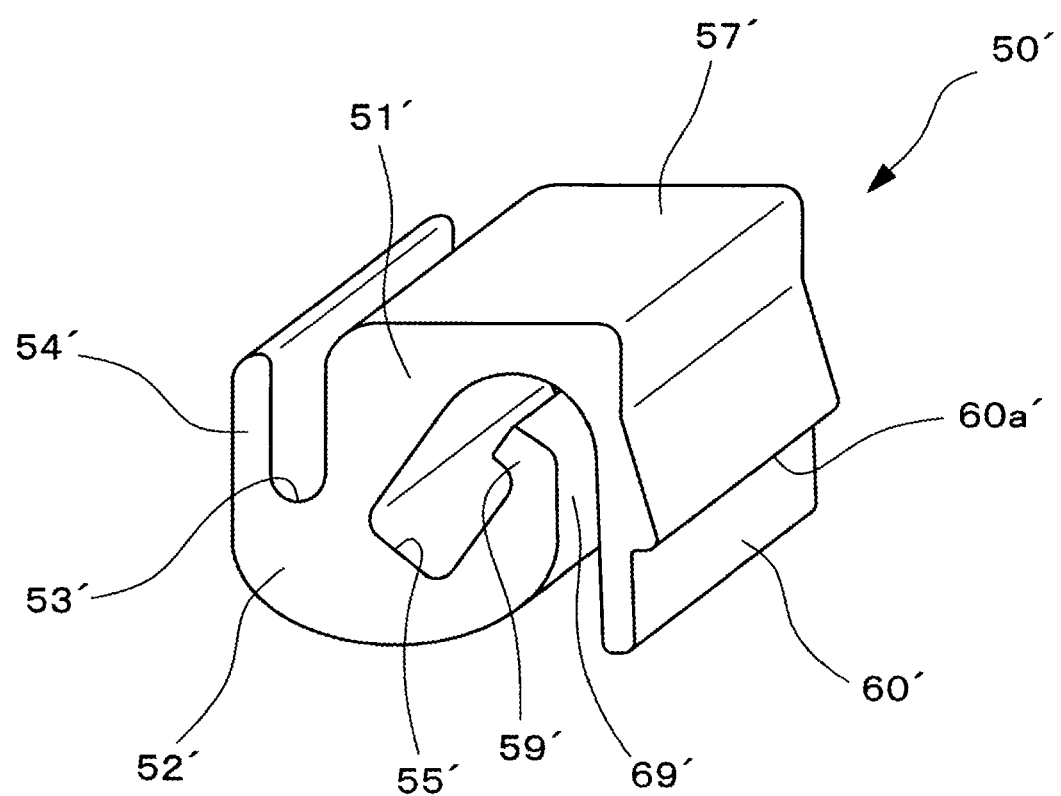
FIG. 9 is a perspective view illustrating an attachment member according to another embodiment.

In this embodiment, the attachment member 50 with the front wall contact surface 56 and the rear wall contact surface 57 is attached to the side frame 10 having the attachment hole 12h formed in the inner wall 12a, but the present invention is not limited thereto. As illustrated in FIGS. 7 to 9, an attachment member 50' which includes a rear wall contact surface 57' and does not include a front wall contact surface may be attached to a side frame 10' having an attachment hole 12h' formed from an inner wall 12a' to a front wall 12b'.

In the examples of FIGS. 7 to 9, as illustrated in FIG. 7, the side frame 10' includes an attachment hole 12h' which is formed at two positions in the up and down direction. The attachment hole 12h' is formed from the inner wall 12a' to the front wall 12b', and a portion formed in the front wall 12b' is formed in the entire length of the front wall 12b' in the width direction of the seat S. The other configurations of the side frame 10' are the same as those of the side frame 10. The portion from the inner wall 12a' to the front wall 12b' or the front walls 12b' and 11b' correspond to the connection positions of the plurality of facing side frame elements of embodiments.

As illustrated in FIG. 9, the attachment member 50' includes a wide portion 51' which has a substantially rectangular cross-sectional shape substantially following a shape of an inner surface of a portion having a L-shaped cross-section reaching an outer wall 11a' from the front wall 11b' of the side frame 10', a locking portion 52' which is formed near the front wall 11b' of the wide portion 51', and an extension portion 54' which is formed so that the end opposite to the wide portion 51' in the locking portion 52' extends toward the extension side of the stay cloth 32 and is covered by the outer surface of the front wall 11b' at the front side of the seat S. The attachment member 50' has a substantially uniform cross-sectional shape in the extension direction of the side frame 10' in the attachment state.

In locking portion 52', a groove 53' which extends from the wide portion 51' to lock the attachment member 50' to the front wall 11b' is formed at the side of the front wall 11b' of the wide portion 51'. The groove 53' is formed as a space between the wide portion 51' and the extension portion 54' extending from the base portion of the wide portion 51'. The groove 53' is attached to the end of the attachment hole 12h' at the outside in the width direction of the seat S, and sandwiches the front wall 11b'.

The wide portion 51' includes a rear wall contact surface 57' which is perpendicular to the depth direction of the groove 53'.

The wide portion 51' includes a locking part 55' which locks the trim plate 37 while retaining the trim plate therein and first and second walls 59' and 60' which form both wall surfaces of a slit 69' used as a passage of the stay cloth 32 drawn out from the locking part 55'.

The outer surface of the second wall 60' is parallel to the groove 53' and is perpendicular to the rear wall contact surface 57'. The outer surface of the second wall 60' is provided with a protrusion 60a' of which a portion near the rear surface contact surface 57' protrudes outward and serves as a step. The protrusion 60a' extends from the upper end of the attachment member 50' to the lower end thereof, and is formed in a linear shape in the side view.

The groove 53' and the extension portion 54' are perpendicular to the rear wall contact surface 57' and are parallel to the second wall 60'. The rear wall contact surface 57' is perpendicular to the second wall 60'. Further, the front wall 11b' stored in the groove 53' and the trim plate 37 stored in the locking part 55' during the assembly are inclined relative to each other while an acute angle is formed therebetween.

The other configurations of the attachment member 50' are the same as those of the attachment member 50.

As illustrated in FIG. 8, the attachment member 50' is attached to the side frame 10' in a manner such that the attachment member is inserted into the attachment hole 12h' while the trim plate 37 to which the end of the stay cloth 32 is sewn is retained inside the locking part 55'.

At this time, a portion near the rear wall contact surface 57' in relation to the protrusion 60a' in the attachment member 50' is stored in a space inside the side frame 10'.

Further, a wall surface near the wide portion 51' in the groove 53' comes into contact with the rear surface of the front wall 11b', the rear wall contact surface 57' comes into contact with the surface of the outer wall 11a' at the inside of the seat S, and the protrusion 60a' comes into contact with the end of the attachment hole 12h' at the rear side of the seat S in the surface of the inner wall 12a' at the outside of the seat S.

Further, in this embodiment, the attachment hole 12h' used to attach the stay cloth 32 is formed in the inner frame 12'. However, a configuration may be employed in which the attachment hole 12h' is formed from the outer wall 11a' of the outer frame 11' to a rear wall 11c' thereof and the attachment member 50' connected to the stay cloth 32 is attached to the outer frame 11'.

Further, in this embodiment, the guide member that guides the deployment direction of the airbag module 6 is provided only for the inner stay cloth 32 passing through the front side of the airbag module 6. However, as another example of the guide member, a configuration may be employed in which an outer stay cloth (not illustrated) passing between the rear surface of the airbag module 6 and the rear cushion pad 5 is provided, a pair of attachment holes like the attachment holes 12h' is provided from the inner wall 12a' to the rear wall 12c' in the side frame 10' instead of the elongated hole 12s', and the outer stay cloth is attached to the attachment holes through the attachment member 50'.

In this case, one-side end of the outer stay cloth is sewn to the fracture portion 40, the outer stay cloth is drawn from the fracture portion 40 into the space 7, and the outer stay cloth is drawn from the surface of the airbag module 6 at the outside of the seat S along the surface at the rear side of the seat S to the rear walls 11c' and 12c' of the side frame 10' while facing the airbag module 6. The end opposite to the fracture portion 40 is provided with an attachment portion (not illustrated) like the attachment portion 36, and a trim plate (not illustrated) is sewn thereto.

Further, a configuration may be employed in which the attachment hole for attaching the outer stay cloth is formed from the outer wall 11a' of the outer frame 11' to the rear wall 11c' thereof and the attachment member 50' connected to the outer stay cloth is attached to the outer frame 11'.

The attachment of the stay cloth 32 with respect to the side frame 10' through the attachment member 50' is performed according to the following procedure.

An operator first folds the attachment portion 36 of the stay cloth 32 once at the boundary between the trim plate 37 and the attachment portion 36, and causes the trim plate 37 and the attachment portion 36 to overlap each other by the width of the trim plate 37.

Next, the attachment portion 36 is inserted into the slit 69' while the trim plate 37 and the attachment portion 36 are held. Next, the trim plate 37 is inserted and pressed into the locking part 55' so that the trim plate 37 having the stay cloth 32 attached thereto is connected to the attachment member 50'.

The attachment members 50' are connected to all attachment portions 36 by performing the same operation repeatedly on all attachment portions 36.

Next, the wide portion 51' of the attachment member 50' is inserted into the attachment hole 12h' of the side frame 10', and the groove 53' is locked to the wall of the attachment hole 12h' at the outside of the seat S. The second wall 60' is pressed into the attachment hole 12h', and the protrusion 60a' is caused to come into contact with the wall of the attachment hole 12h' at the rear side of the seat, so that the attachment member 50' is positioned.

The attachment of the stay cloth 32 with respect to the side frame 10' through the attachment member 50' is completed by performing the above-described operation on all attachment members 50'.

Figure 10:
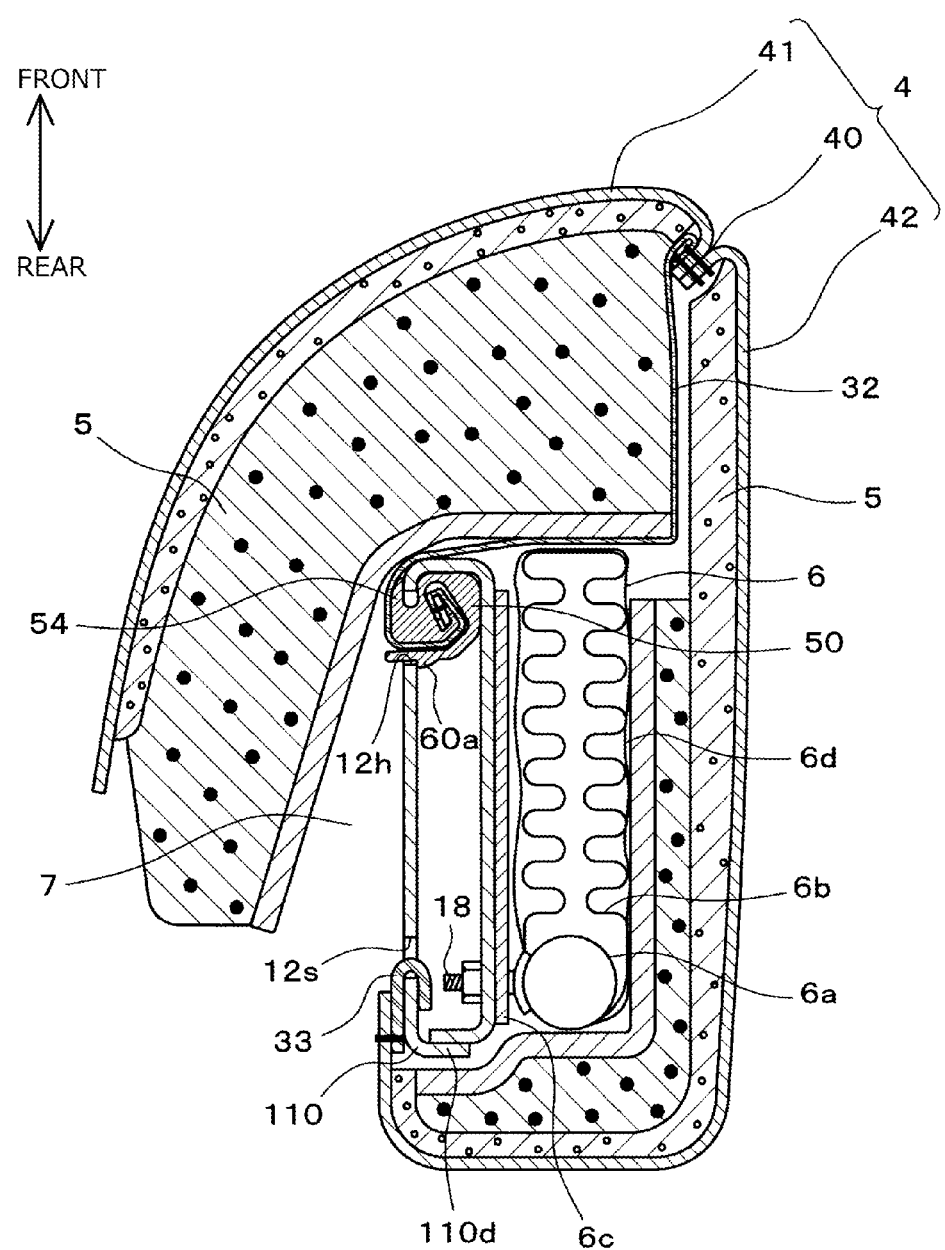
FIG. 10 is a cross-sectional view taken along the line A-A of FIG. 1 in the case where a side frame according to still another embodiment is applied.

In the embodiment illustrated in FIGS. 1 to 6 and the embodiment illustrated in FIGS. 7 to 9, the side frame 10 is formed by the outer frame 11 and the inner frame 12 each having a shallow U-shaped cross-section while the end surfaces thereof are fixed to each other in an abutting state, but a side frame 110 illustrated in FIG. 10 may be used. An overlapping portion 110d which is formed by the plate members overlapping each other through bending is disposed at a position distant from the cushion pad 5 while not coming into contact with the cushion pad 5.

The side frame 110 of FIG. 10 is formed in a manner such that one metallic plate member is bent to form a tubular body having a rectangular cross-sectional shape in a flat section structure. Since the other configurations of the seat S equipped with the airbag module 6 using the side frame of FIG. 10 are the same as those of the embodiment illustrated in FIGS. 1 to 6 and the embodiment illustrated in FIGS. 7 to 9, the description thereof will not be repeated.

REFERENCE SIGNS LIST

S seat
S1 seat back
S2 seat portion
S3 headrest
F seat frame
1 seat back frame
2 seat frame
3 reclining mechanism
4 trim cover
5 cushion pad 6 airbag module
6a inflator
6b airbag
6c retainer
6d wrapping material
7 space
10, 10', 110 side frame
11, 11' outer frame
12, 12' inner frame
11a, 11a' outer wall
12a, 12a' inner wall
11b, 12b, 12b' front wall
11c, 12c, 12c' rear wall
12h, 12h' attachment hole
12s, 12s' elongated hole
18 bolt
21 upper frame
22 lower frame
23 pillar support portion
32 stay cloth
33 locking member
34 edge near fracture portion
35 edge facing fracture portion
36 attachment portion
37 trim plate
40 fracture portion
41 front surface gusset portion
42 side surface gusset portion
42e end edge
50, 50' attachment member
51, 51' wide portion
52, 52' locking portion
53, 53' groove
54, 54' extension portion
54e end
55, 55' locking part
56 front wall contact surface
57, 57' rear wall contact surface
59, 59' first wall
60, 60' second wall
60a, 60a' protrusion
69, 69' slit
110 overlapping portion

The invention claimed is:

1. A seat, comprising:
a side frame that extends along a side portion of the seat;
an airbag module for storing an airbag, the airbag module being attached to the side frame; and
a guide member that is attached to a trim cover of the seat and guides a deployment of the airbag in a deployment direction,
wherein:
the side frame comprises a plurality of side frame elements that extend along the side portion of the seat and are connected to each other in at least one position while facing each other; and
the guide member is attached to the side frame.

2. The seat according to claim 1, wherein:
the side frame comprises a concave portion used to attach the guide member thereto; and
the guide member is connected to an attachment member that comprises a connecting portion connected to one-side end of the guide member and a connection portion connected to the concave portion of the side frame.

3. The seat according to claim 2, wherein:
the side frame is formed in a hollow closed section structure with a pair of walls connecting a pair of the side frame elements at front and rear sides of the seat; and
the concave portion is an attachment hole.

4. The seat according to claim 2, further comprising:
a rotation suppressing portion that suppresses rotation of the attachment member with respect to the side frame located between the attachment member and the side frame.

5. The seat according to claim 3,
wherein the attachment member comprises a retaining portion that suppresses disengagement of the attachment member from the attachment hole.

6. The seat according to claim 1,
wherein one-side end of the guide member is stored in a space surrounded by the side frame elements of the side frame.

7. The seat according to claim 5, wherein:
each of the pair of the side frame elements comprises a pair of walls comprising:
an outer wall which is located at an outside of the seat to attach the airbag module thereto; and
an inner wall which is located at an inside of the seat to face the outer wall,
wherein each of the pair of walls comprises front and rear walls which are located at the front side and the rear side of the seat to connect the inner wall and the outer wall to each other,
wherein:
the attachment hole is formed in the inner wall of the side frame; and
the connection portion of the attachment member is a groove that sandwiches the wall at the front side of the seat in the attachment hole.

8. The seat according to claim 7, wherein:
the attachment member comprises:
an outer wall contact surface which comes into contact with an inner surface of the outer wall of the side frame; and
a front wall contact surface which comes into contact with an inner wall of the front wall of the side frame, and
the retaining portion is formed as a protrusion that comes into contact with an inner surface of a rear end of the attachment hole.

9. The seat according to claim 3, wherein:
the attachment hole is formed at a position where the plurality of the side frame elements facing each other are connected to each other; and
the connection portion of the attachment member is a groove that sandwiches a wall of the airbag module attachment side surface of the attachment hole.

10. The seat according to claim 8, wherein:
the connecting portion is formed as a retaining space that separably retains one-side end of the guide member therein;
the attachment member comprises:
a slit that extends from the retaining space to an outer surface of the attachment member and communicates with the retaining space to form a passage of the guide member;
an outer wall contact surface that forms an outer wall of the retaining space and comes into contact with the inner surface of the outer wall of the side frame; and
an upright wall that is uprightly formed from the outer wall contact surface toward the inner wall of the side frame and forms an outer wall of the slit, and wherein a portion that is continuous from the outer wall contact surface to the upright wall is stored in a hollow space inside the side frame.

11. The seat according to claim 3, wherein a plurality of the attachment holes are provided.

\* \* \* \* \*